Nov. 5, 1940.   C. F. D. VENNING ET AL   2,220,744
TRAFFIC CONTROLLING SYSTEM FOR RAILWAYS AND THE LIKE
Filed Feb. 21, 1940
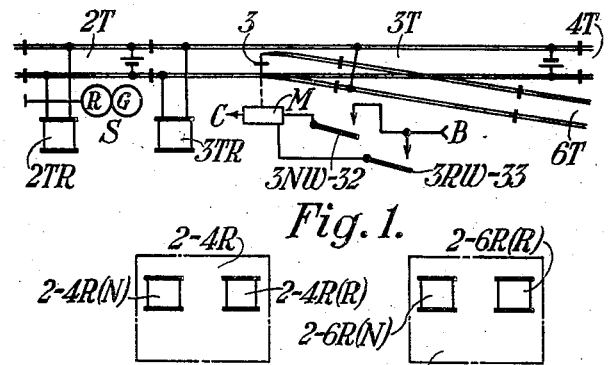
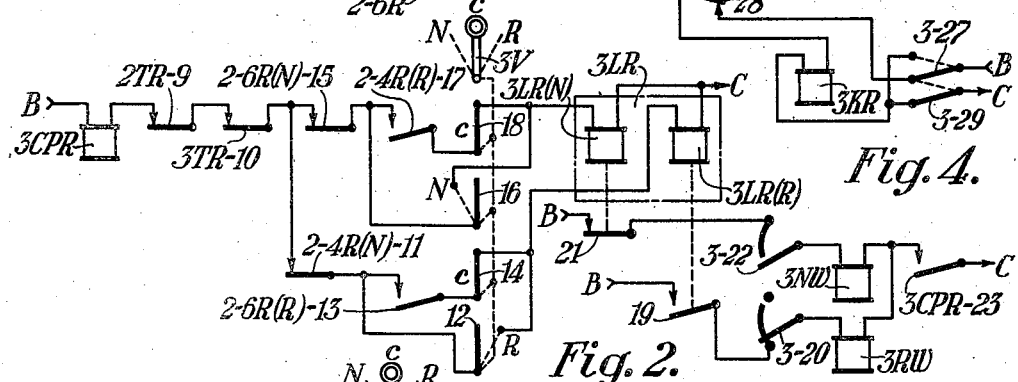
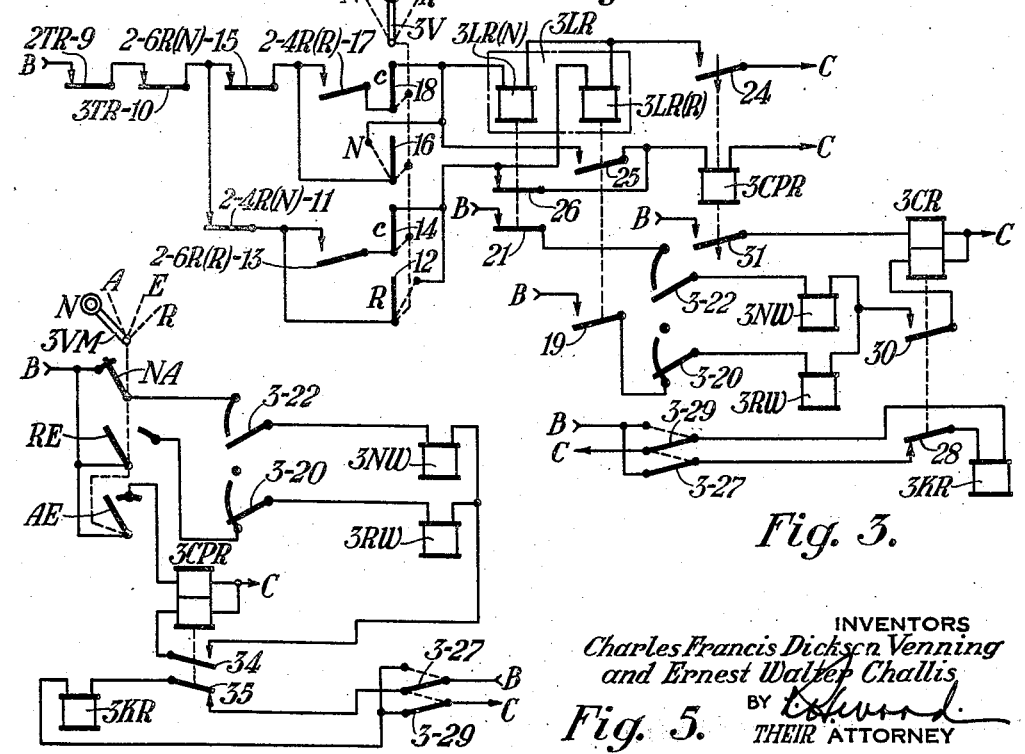
INVENTORS
Charles Francis Dickson Venning
and Ernest Walter Challis
BY
THEIR ATTORNEY Patented Nov. 5, 1940

2,220,744

UNITED STATES PATENT OFFICE 2,220,744

TRAFFIC CONTROLLING SYSTEM FOR RAILWAYS AND THE LIKE

Charles Francis Dickson Venning and Ernest Walter Challis, London, England, assignors, by mesne assignments, to The Union Switch & Signal Company, Swissvale, Pa., a corporation of Pennsylvania Application February 21, 1940, Serial No. 320,142
In Great Britain November 15, 1938

6 Claims. (Cl. 246—134)

This invention relates to traffic controlling systems for railways and the like of the kind comprising a track switch or set of points provided with an electrically operated point machine or its equivalent, and more particularly to systems of this kind in which the supply of operating current to the point machine is controlled by a point relay or set of relays. The invention has for its object to provide arrangements whereby the operation of the point machine by the accidental supply of current either to the operating circuits of the point machine or to the point control relay circuit or both from an extraneous source will be prevented.
According to the principal feature of the invention, a relay hereinafter termed a cross-protection relay is provided, an energising winding of which is connected in series in the point control circuit adjacent to one terminal of the source from which this circuit is supplied with energising current, the cross-protection relay being arranged to control directly or indirectly the operating circuit of the point machine so that this operating circuit is opened unless the cross-protection relay has been energised.

As a result, if the point relay circuit should become accidentally connected to a live conductor at a potential which is the same as that of the terminal of the source above referred to, the cross-protection relay will not be energized by this accidental connection and the operating circuit of the point machine will consequently not be closed, while if, on the other hand, the potential of the live conductor is opposite to that of the terminal, the point relay will not be energized and the point machine will not therefore be caused to operate. Furthermore, cross-protection of the point machine circuit itself against extraneous current is also obtained since so long as the cross-protection relay is de-energised the point machine circuit is open at the relay contacts and any accidental supply of current to this circuit is thus ineffective to cause operation of the machine.
The invention is particularly applicable to systems in which the point control relay for controlling the operation of the point machine is of the point-interlocking type comprising two operating windings, one or other of which must be separately energised to effect the setting of the points to their normal or reverse position from the opposite position and their locking in the new position, the relay remaining in the position to which it was last set when its winding is again de-energised.

In the application of the invention to a system of this kind, the winding of the cross-protection relay may be connected in the energising circuit for both windings of the point-interlocking relay adjacent to one terminal of the source of current for this circuit, the common return circuit for the operating windings of the point machine including contacts which are closed only when the cross-protection relay is energised.

The energising circuit for the point interlocking relay will include the usual route control contacts and interlocking contacts controlled by the point interlocking relays for other routes, this circuit also including the contacts of approach locking relays or other automatic control.

In a modified system comprising a point interlocking relay, the circuit of each of the energising windings of the relay is arranged to be interrupted as soon as the relay has fully responded to the energisation of the winding, so that the cross-protection relay is de-energised when this occurs. In such cases, the cross-protection relay is arranged to be of the slow or retarded release type and to effect the energisation of an additional relay which when thus energised completes the common return circuit for the point machine, the additional relay being de-energised when the point machine has completed the setting of the points to their new positions. The slow release of the cross-protection relay permits the additional relay to be energised for this purpose before the cross-protection relay is released after its de-energisation by the response of the point interlocking relay.

The inventon may also be applied to a system in which the control of the point control relay is effected by the usual manually operated lever at the point of control in which case a cross-protection relay having two windings is provided, one of which is temporarily energised by the initial movement of the lever to set the points, the other winding being energised when the lever is in either of its extreme positions. The cross-protection relay, when either of its windings is energised, is arranged to complete the return circuit for the point machine as in the other systems above described.

The cross-protection relay may be arranged to control either directly or through the additional relay the energising circuit of the usual point indication relay so that this relay can only be energised when the cross-protection or the additional relay is de-energised.

In order that the invention may be more readily understood, a number of systems embodying the invention will now be described with reference to the accompanying drawing in which Figure 1 is a simple track layout, Figure 2 is a circuit diagram for one system adapted to control traffic over this layout,

Figure 3 is a similar diagram of another system,

Figure 4 shows a modification, and

Figure 5 is a circuit diagram of still another system.

Referring now first to Figure 1, this figure shows a very simple track layout comprising an approach section 2T, a set of points 3 with an associated fouling section 3T, a "normal" or main-line exit section 4T, and a "reverse" or branch-line exit section 6T, a signal S being provided for governing traffic over the points. Each route will be designated by the numbers of its entrance and exit sections, 2—4 for instance being a route starting from section 2T and leading to 4T.

Referring now to the circuit diagrams, it is assumed in each case that the point machine for the points 3 is provided with two windings 3NW and 3RW for setting the points 3 to normal and reverse, respectively, contacts 3—20 and 3—22 operated by the point machine or the points themselves being provided as usual for interrupting the engising current for these windings when an operation has been completed. Windings 3NW and 3RW may be of the contactor type, controlling operation of a switch or point motor M to normal and reverse positions through contacts 3NW—32 and 3RW—33, respectively, as shown in Fig. 1.

In the arrangements illustrated in Figures 2 to 4, the energisation of the point machine is arranged to be controlled by a point-interlocking relay 3LR, which is provided with two windings 3LR (N) and 3LR (R) which respectively control the setting of the points to their normal and reverse positions.

The circuit for the normal winding of the point-interlocking relay 3LR includes in series in the usual manner front contacts 2TR—9 and 3TR—13 of track relays 2TR and 3TR, respectively, of the approach and fouling sections 2T and 3T, a normal contact 2—6R(N)—15 of route contact device 2—6R for the conflicting route 2—6 and, in parallel with each other, a normal contact 16 of the individual point-control device 3V, and a reverse contact 2—4R(R)—17 of the route-contact device 2—4R for the route 2—4 in series with a neutral or central contact 18 of the individual point control device; the circuit for the reverse winding of the point-interlocking relay is similar, except that the functions of the two route-contact devices 2—4R and 2—6R are reversed, and a reverse contact 12 is substituted for the normal contact 16 of the individual point control device. This usual control circuit for the point-interlocking relay is modified according to the present invention by the inclusion of the winding of the cross-protection relay 3CPR adjacent to one terminal of the supply voltage, and it will be seen that this winding is included according to Figure 2 in the common supply wire adjacent to terminal B. The control circuits for the point machine windings 3NW and 3RW as illustrated in the lower portion of Figure 2 include respectively a "normal" contact 21 and a "reverse" contact 19 of the point-interlocking relay 3LR, while contacts 3—22 and 3—20 operated by the point machine are included in these circuits, and a front contact 3CPR—23 of the cross-protection relay 3CPR is included in the common return wire leading to supply terminal C.

The route-contact devices 2—4R and 2—6R may be of the route-interlocking relay type having two windings similar to those of the switch or point interlocking relay 3LR as indicated in the drawing. The normal and reverse windings of the route-interlocking relays may be controlled in any suitable manner, such for example as by means including normal and reverse contacts, respectively, of route levers, not shown in the drawing.

From the arrangement described, it will be evident that the point machine will only be operated if both the corresponding winding of the route-interlocking relay and the cross-protection relay are energised, and it will also be evident that, should for example the normal winding of route-interlocking relay 3LR be energised owing to accidental contact of its supply wire with a conductor of the same potential as supply wire B, while one or both of the track relays 2TR and 3TR are deenergized, the cross-protection relay 3CPR will obviously remain deenergised thus preventing the point machine from being operated in these circumstances. Moreover it will be seen that, owing to the fact that the two relays 3CPR and 3LR, controlling the operation of the point machine are arranged at one end each of the chain of control contacts in the control circuit of interlocking relay 3LR, these relays will never be simultaneously energised by the accidental contact with any point of this control circuit of an external source of any potential.

In the arrangements illustrated in Figures 3 to 5, a similar protection is obtained with somewhat modified systems. The control circuit for the point-interlocking relay 3LR in Figure 3 is mainly distinguished from that of the system just described by the inclusion of a front contact 24 of cross-protection relay 3CPR, which itself is provided with slow-release characteristics and has its winding connected adjacent to terminal C in parallel with the two windings of the point-interlocking relay 3LR, a reverse contact 25 of the latter relay being included in the energising circuit for relay 3CPR branched off the supply wire for the normal winding of relay 3LR, and a normal contact 26 of relay 3LR being included in the energising circuit for 3CPR branched off the supply wire for the reverse coil of relay 3LR.

Owing to this arrangement, relay 3CPR will be released as soon as the points have started their movements and, although the point-interlocking relay 3LR is arranged to stay in the position it has last assumed until it is energized in the opposite direction, the operation of the points would be interrupted at the expiration of the release period of relay 3CPR if a front contact of this relay were included in the common return wire of the two windings 3NW and 3RW of the point machine as in the example of Figure 2. In order to avoid this, the relay 3CPR is arranged to control a repeater or second cross-protection relay 3CR, which is provided with a stick circuit including in parallel the two windings 3NW and 3RW of the point machine together with their controlling contacts, a contact 30 of this repeater relay 3CR being included in the common return wire of the point machine circuits instead of a contact of the cross-protection relay 3CPR. As will be evident, the repeater relay 3CR will pick up when relay 3CPR picks up and closes its contact 31, and the point-interlocking relay being in one of its two control positions, and will remain energised until the operation of the points is completed, when it is released owing to one of the contacts 3—22 and 3—20 being opened. A further contact 28 of relay 3CR may be included in the point or switch indication circuit between the pole changer contacts 3—27 and 3—29 operated by switch points 3 and the indication relay 3KR as schematically indicated in Figure 3 so that no indication current can flow unless the points are being set under proper safety conditions.

While it has been assumed in Figure 3 that the repeater relay 3CR is arranged adjacent to the point machine, this relay may also in practice be arranged in the signal cabin, the slight modifications involved by this arrangement being indicated in Figure 4, which it is believed will not require any further description.

While the examples so far described utilise the cross-protection relay in systems in which the operation of the point-machine is controlled by a point-interlocking relay, the invention may also be applied to so-called power-interlocking frames in which the various point and signal levers are mechanically interlocked. The circuits of such a system are illustrated in Figure 5. The cross-protection relay 3CPR, a front contact of which is again included in the common return wire for the two energising circuits of the point machine, is provided with a pick-up circuit which includes an intermediate contact AE of the point lever 3VM, while a second winding of the relay 3CPR is connected in series with its own front contact 34 in the common return wire of the two energising circuits of the point machine, which are respectively controlled by the normal and reverse end contacts NA and RE of the point-control lever and each of which includes one of the contacts 3—20 and 3—22 operated by the point machine. As will be evident, the cross-protection relay will, once picked up, remain energised until the point machine has completed its operation. A back contact 35 of cross-protection relay 3CPR may again be included in the point or switch indication circuits.

It will be understood that the invention is not limited in its application to the systems above described by way of example, nor to any particular construction relay for utilization as a cross-protection relay.

Having now particularly described and ascertained the nature of our said invention and in what manner the same is to be performed, we declare that what we claim is:

1. Cross-protection apparatus for a railway track switch having control means including normal and reverse magnets, comprising in combination, a cross-protection relay, a normal control circuit including said relay in series with said normal magnet for energizing said relay and said normal magnet, a reverse control circuit including said relay in series with said reverse magnet for energizing said relay and said reverse magnet, and means controlled by energization of said normal and reverse magnets for operating said switch to normal and reverse positions respectively only if said cross-protection relay is energized.

2. Cross-protection apparatus for a railway track switch having control means including normal and reverse magnets, comprising in combination, a cross-protection relay, a normal manual control device, a reverse manual control device, a normal control circuit path including said normal manual control device for energizing said relay and said normal magnet, a reverse control circuit path including said reverse manual control device for energizing said relay and said reverse magnet, and means controlled by energization of said normal and reverse magnets for operating said switch to its normal and reverse positions respectively only if said cross-protection relay becomes energized.

3. Cross-protection apparatus for a railway track switch having control means including normal and reverse magnets, comprising in combination, a cross-protection relay, a manual control device having a normal and a reverse control position, means responsive to an operation of said manual control device from either of said control positions to the other for energizing said cross-protection relay in series with the corresponding normal or reverse magnet, and means responsive to energization of said normal and reverse magnets for operating said switch to its normal and reverse positions respectively only if said cross-protection relay is energized.

4. Cross-protection apparatus for a railway track switch having control means including normal and reverse magnets, comprising in combination, a cross-protection relay having a pick-up winding and a retaining winding, a manual control device having a normal and a reverse control position, means responsive to an operation of said manual control device from either of said control positions to the other for energizing the pick-up winding of said cross-protection relay and for then energizing the retaining winding of said cross-protection relay through its own front contact and in series with the corresponding normal or reverse magnet, and means responsive to energization of said normal and reverse magnets for operating said switch to its normal and reverse positions respectively.

5. Cross-protection apparatus for a railway track switch having control means including normal and reverse magnets, comprising in combination, a cross-protection relay, a normal manually controllable circuit for energizing said normal magnet in multiple with said cross-protection relay, a reverse manually controllable circuit for energizing said reverse magnet in multiple with said cross-protection relay, a repeater relay having a pick-up winding and a retaining winding, means controlled by a front contact of said cross-protection relay for energizing the pick-up winding of said repeater relay, a normal operating magnet, a reverse operating magnet, a normal and a reverse operating circuit for energizing said normal or said reverse operating magnet respectively in series with a front contact and the retaining winding of said repeater relay, and means responsive to energization of said normal and reverse operating magnets for operating said switch to its normal and reverse positions respectively.

6. Cross-protection apparatus for a railway track switch having normal and reverse operating magnets, comprising in combination, a cross-protection relay having a pick-up winding and a retaining winding, a manual control device having a normal and a reverse control position, a pick-up circuit for energizing the pick-up winding of said cross-protection relay if said manual control device is between said control positions, a normal and a reverse operating circuit closed by said manual control device in said normal and reverse control positions respectively for energizing said normal or reverse operating magnet respectively in series with the retaining winding and a front contact of said cross-protection relay, and means responsive to energization of said normal and reverse operating magnets for operating said switch to its normal and reverse positions respectively.

CHARLES FRANCIS DICKSON VENNING.
ERNEST WALTER CHALLIS.